United States Patent
Banwell et al.

(10) Patent No.: US 8,942,658 B2
(45) Date of Patent: Jan. 27, 2015

(54) DIRECTIONAL NOTCH FILTER FOR SIMULTANEOUS TRANSMIT AND RECEIVE OF WIDEBAND SIGNALS

(75) Inventors: Thomas Banwell, Howell, NJ (US); Ted Woodward, Holmdel, NJ (US); Joseph C Liberti, Howell, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 77 days.

(21) Appl. No.: 13/285,799

(22) Filed: Oct. 31, 2011

(65) Prior Publication Data
US 2012/0282872 A1 Nov. 8, 2012

Related U.S. Application Data

(60) Provisional application No. 61/482,746, filed on May 5, 2011.

(51) Int. Cl.
*H04B 1/06* (2006.01)
*H04Q 1/50* (2006.01)
*H01Q 1/50* (2006.01)
*H04B 1/58* (2006.01)

(52) U.S. Cl.
CPC ...................................... *H04B 1/58* (2013.01)
USPC ............................. 455/269; 343/852; 343/860

(58) Field of Classification Search
CPC ..... H01Q 13/02; H01Q 13/06; H01Q 13/203; H01Q 13/22; H01Q 1/00; H01Q 1/241; H01Q 1/242; H01Q 1/243; H01Q 3/44; H01Q 9/0407; H01Q 9/0421; H01Q 9/0442; H01Q 9/16; H01Q 9/28; H01Q 9/30; H01Q 9/42; H01Q 1/50; H01Q 21/00; H03B 5/04; H04B 1/06

USPC ............. 455/63.1, 67.11, 67.13, 78–83, 295, 455/296, 303, 306, 307, 334, 339, 269; 343/852, 860
See application file for complete search history.

(56) References Cited

U.S. PATENT DOCUMENTS 4,980,656 A * 12/1990 Duffalo et al. ............... 333/17.1
5,029,237 A 7/1991 Ragan
(Continued)

OTHER PUBLICATIONS

Wang et al., "An Equivalent Circuit Modeling Method for Ultra-Wideband Antennas," Progress in Electromagnetics Research, PIER 82, pp. 433-445, 2008, http://www.jpier.org/PIER/pier82/28.08032303.pdf.
(Continued)

*Primary Examiner* — Andrew Wendell
*Assistant Examiner* — Maryam Soltanzadeh

(57) ABSTRACT

A directional notch filter for simultaneous transmit and receive of wideband signals comprises an antenna, an antenna match, a receiver, a power combiner, a first directional coupler, a second directional coupler and a shaping filter accepting a signal and producing a compensation signal as a replica of an antenna reflection transfer function, wherein the first and second directional couplers produce signals and portions of signals received by the antenna and sent to the receiver via the power combiner. The receiver can produce a receiver signal and the first directional coupler can produce a first signal as a portion of an overall signal received by the antenna, the first signal comprising at least reflection of a signal from the power amplifier and the second directional coupler samples a small portion of the receiver signal, said second directional coupler producing a second signal.

4 Claims, 10 Drawing Sheets

(56) References Cited

U.S. PATENT DOCUMENTS

| | | |
|---|---|---|
| 6,704,557 B1 | 3/2004 | Krishnamurthy et al. |
| 7,072,625 B2 | 7/2006 | Henshaw et al. |
| 7,177,368 B2* | 2/2007 | Humphreys et al. ........ 375/295 |
| 7,212,789 B2* | 5/2007 | Kuffner ........................ 455/83 |
| 7,541,890 B2 | 6/2009 | Cheung et al. |
| 7,894,779 B2* | 2/2011 | Meiyappan et al. ........... 455/83 |
| 2004/0218699 A1* | 11/2004 | Carsello ...................... 375/343 |
| 2004/0248613 A1* | 12/2004 | Gorcea et al. ................ 455/551 |
| 2006/0217082 A1* | 9/2006 | Fischer ..................... 455/114.2 |
| 2011/0051670 A1* | 3/2011 | Safarian et al. .............. 370/328 |

OTHER PUBLICATIONS

International Application No. PCT/US2012/035960—PCT International Search Report dated Jul. 17, 2012.

* cited by examiner ial patent application 61/482,746 filed May 5, 2011, the
DIRECTIONAL NOTCH FILTER FOR SIMULTANEOUS TRANSMIT AND RECEIVE OF WIDEBAND SIGNALS

CROSS REFERENCE TO RELATED APPLICATIONS

The present invention claims the benefit of U.S. provisional patent application 61/482,746 filed May 5, 2011, the entire contents and disclosure of which are incorporated herein by reference as if fully set forth herein

FIELD OF THE INVENTION

This invention relates generally to wideband signals, wireless transmission, IED migration and, more specifically, to simultaneous transmit and receive of wideband signals.

BACKGROUND OF THE INVENTION

There are several well known methods for implementing the transmit/receive coupler in a transceiver which both transmits and receives. For example, a Single Pole Double Throw (SPDT) switch is employed in a wide range of applications where talk and listen do not occur simultaneously, as with most transceivers using Time Division Multiplexing (TDM). Simultaneous transmit and receive (STAR) has been accomplished using a frequency diplexer, circulator or hybrid coupler as illustrated in FIG. 1. This can be combined with Code Division Multiple Access (CDMA).

A frequency diplexer can often handle high power and works well for frequency separations of 10 MHz or more. However, it is not suitable for waveforms with overlapping transmit and receive spectra. STAR implementations using a circulator or hybrid coupler generally require excellent antenna matching to minimize leakage of transmit signal into the receiver caused by antenna reflection. This reflection is difficult to achieve in practice and becomes more difficult as operating bandwidth increases.

FIG. 1 illustrates a block diagram of a radio 100 that is receiving signal 118 from transmitter 119 and simultaneously interacting with a hostile radio 117 through transmit signal 116. Signal 116 could be intended to disrupt communication between 119 and 117 in some situations. The transmitter circuit includes broadband signal generator 110 and power amplifier 111 which produces transmit signal 113 with a power of 10-100 W or more. Antenna coupler 103 directs the output from power amplifier 111 (via port 103b) to the antenna match 102 and antenna 101 (via port 103c) where it is radiated as signal 116. In some cases, antenna match 102 may be integral to antenna 101. Antenna 101 also receives a desired signal 117 from transmitter 119. The signal received by antenna 101 from transmitter 119 is conveyed through antenna coupler 103 to the input of receiver subsystem 112 (via port 103a).

The input signal 114 consists of reflection of broadband transmit waveform 113 overlapping with a narrow band or broadband desired received waveform 118. The receiver input signal 114 appearing at coupler port 103a consists of the desired signal 118 as well as a reflected signal created from signal 113 by antenna and coupler mismatch. FIG. 2 illustrates the spectral components of the two signals comprising receiver input signal 114. Item 200a in FIG. 2 represents a small narrowband received signal 202 derived from signal 118 and a larger broadband signal 201 created by reflection of signal 113 by imperfect antenna matching. Item 200b in FIG. 2 illustrates the corresponding spectrum for a small broadband received signal 203 derived from signal 118.

FIG. 2A is a graph of the measured reflection from a small antenna suitable for 0.8-1.8 GHz operation. As mentioned above, minimizing leakage of transmit signal into the receiver caused by antenna reflection is difficult to achieve in practice, with typical performance illustrated in FIG. 2A. This represents power in signal 113 that is reflected by the antenna and would pass from the antenna port of coupler 103 to the receiver as an interfering signal. The reflected power varies from 0.3% to 10% of the power in transmit signal 113. The total reflected power for a transmit signal 113 with uniform power over 0.8-1.8 GHz is 4%. The total reflected power increases to 7% for a waveform spanning 0.7-2.4 GHz. Reflection of this magnitude will generally overload or damage most receiver subsystems when the power of signal 113 is 10-100 W.

Various implementations of FIG. 1 for radar and Joint Counter Radio controlled Improvised Explosive Device Electronic Warfare (JCREW) applications are being developed. Recent work in this field has focused on new ways to implement coupler 103 with wider bandwidth and reduced internal transmit-receive leakage. This work assumes the antenna is well matched and therefore has not addressed the problem of interference from antenna reflection.

Hence, the existing solutions do not address the problem of isolating a high power signal from a low power signal present on a single antenna when the two waveforms have overlapping spectra and the antenna match is imperfect. The high power leakage signal substantially degrades the signal-to-noise ratio (SNR) of the low power received signal due to transmit signal phase noise and receiver dynamic range limitations. Digital Signal Processing (DSP) methods are useless if the receiver Low Noise Amplifier (LNA) or mixer is overdriven, because the subsequent analog to digital conversion (ADC) operations will either be capturing a distorted or saturated signal in which the information required for DSP operation is unrecoverable or missing, or the LNA or mixer will be damaged altogether.

SUMMARY OF THE INVENTION

An inventive directional notch filter with directional selectivity to cancel interference from reflection of the transmit signal by the antenna is presented. This novel solution allows a transceiver with a single antenna to use a wide frequency band for both the reception of radio communication as well as interfering with radio communication of hostile forces. Further, directional notch filtering can augment digital signal processing methods. A directional notch filter can selectively suppress transmitter leakage by 20-40 dB without disturbing a receive signal in the same frequency band. This can be accomplished using one or more directional couplers and controlled reflections to selectively cancel back-reflection from the antenna.

A directional notch filter for simultaneous transmit and receive of wideband signals, comprising an antenna, an antenna match, a receiver, a power combiner, a first directional coupler, a second directional coupler and a shaping filter accepting a signal and producing a compensation signal as a replica of an antenna reflection transfer function, wherein the first and second directional couplers produce signals and portions of signals received by the antenna and sent to the receiver via the power combiner.

In one aspect, the receiver produces a receiver signal and the first directional coupler produces a first signal as a portion of an overall signal received by the antenna, the first signal comprising at least reflection of a signal from the power amplifier and the second directional coupler samples a small portion of the receiver signal, said second directional coupler producing a second signal. In one aspect, the antenna comprises four antennas combined in two antenna arrays. In one aspect, the directional notch filter further comprises a delay operable to match path delay of the signal entering the power combiner.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DISCLOSURE

An inventive directional notch filter is presented.

Figure 1:
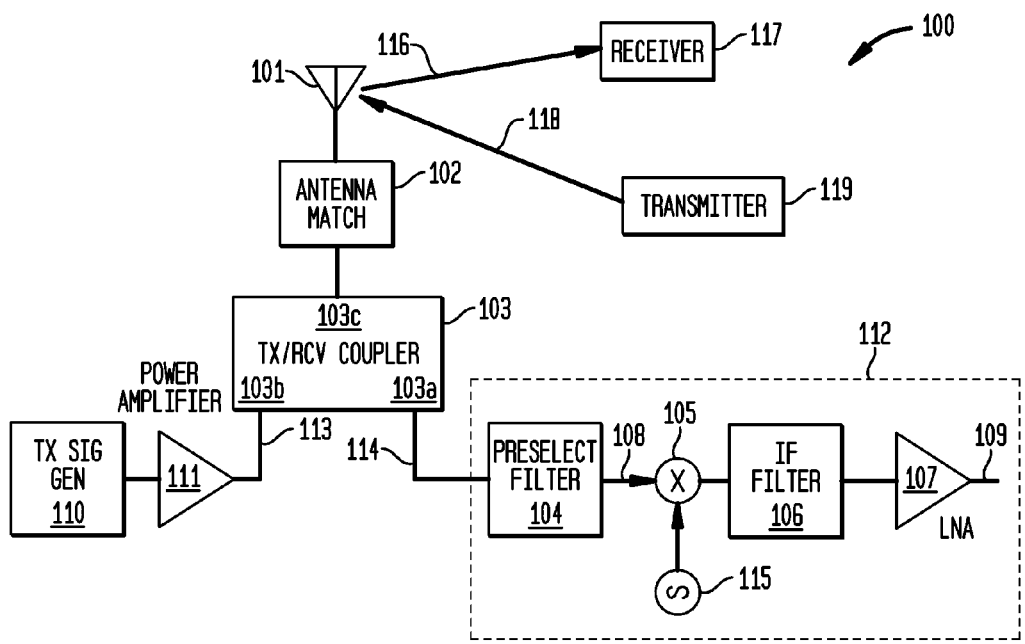
FIG. 1 shows a block diagram of a known radio that transmits a high power broadband waveform and receives a narrow or broadband signal.
Figure 3:
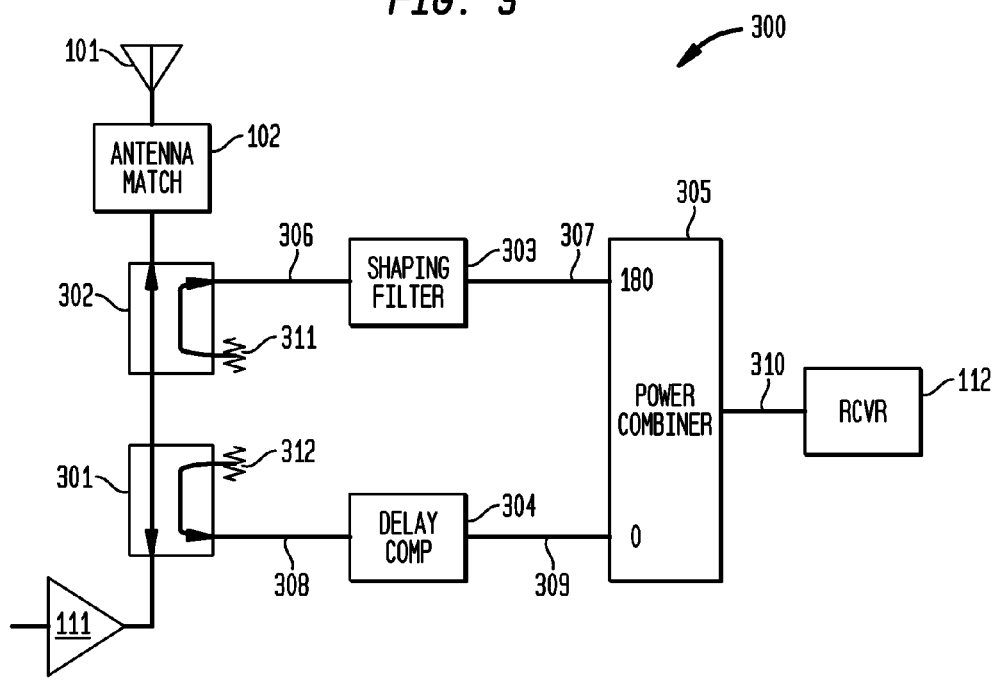
FIG. 3 shows a directional notch filter in accordance with the present invention.

FIG. 3 is a block diagram of the inventive directional notch filter 300 which is suitable for applications with wideband overlapping signals. The antenna coupler 103 of FIG. 1 is implemented in the inventive device using two directional couplers 301 and 302 with a frequency selective combiner. Directional coupler 301 produces signal 308 which is a portion (about 10% or −10 dB) of the signal received by antenna 101. Signal 308 is sent to the receiver 112 via power combiner 305. Signal 308 also includes reflection of signal 113 from power amplifier 111 by antenna 101 and antenna match 102. Directional coupler 302 samples a small portion (about 10% or −10 dB) of transmit signal 113 to produce signal 306. Shaping filter 303 accepts signal 306 and produces compensation signal 307 which is a replicate of the antenna reflection transfer function. Power combiner 305 subtracts compensation signal 307 from desired signal 306 to cancel the self interference. Delay 304 is used to match the path delay of signals entering combiner 305.

Signal 308 includes the desired received signal $V_R$ from signal 118 and reflected energy:

$$V_{308}=\beta_{301}V_{REC}+\alpha_{301}\Gamma_A V_{113} \qquad (1)$$

where $\alpha$ is the forward coupling factor and $\beta$ is the forward loss in the direct path: typically $\alpha^2+\beta^2 \cong 1$.

The antenna reflection is related to the antenna impedance $Z_A$ by:

$$\Gamma_A = \frac{Z_A - R_0}{Z_A + R_0} \qquad (2)$$

Compensation signal 307 is determined by the shaping filter transfer function $H_{303}$ as $$V_{307}=\beta_{301}\alpha_{302}H_{303}V_{113} \qquad (3)$$

With simple delay matching, the received signal 114 is:

$$V_{114}=V_{REC}(\beta_{302}\alpha_{301}\Gamma_A - \beta_{301}\alpha_{302}H_{303})V_{113} \qquad (4)$$

The reflected signal can be attenuated by setting $\beta_{302}\alpha_{301}\Gamma_A=\beta_{301}\alpha_{302}H_{303}$ without adversely affecting the received signal. The wideband application differs from previous HF applications in that transmission line impedance is more critical and the radio frequency (RF) power amplifier may not have controlled output impedance. The reflection coefficient given by EQ. 2 depends on the characteristic impendence $R_0 \approx 50\Omega$ of the couplers. Terminations 311 and 312 at the isolation port of the directional couplers prevent multiple reflections within the compensation network. Power combiner also provides isolation between the signals 306-307 and 308-309.

Figure 4:
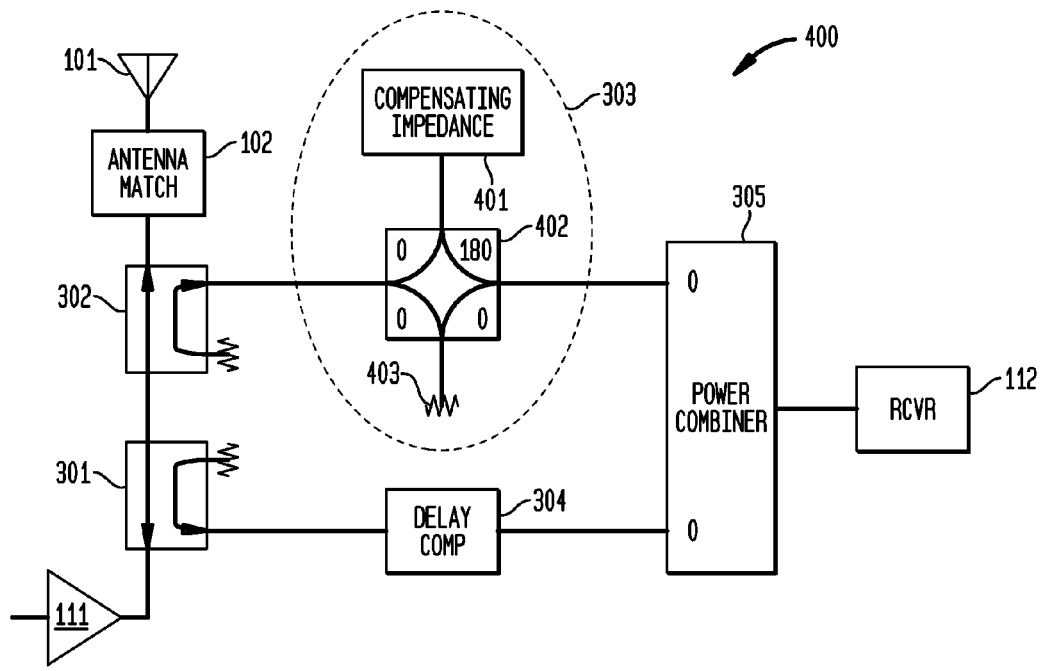
FIG. 4 shows the shaping filter of the directional notch filter shown in FIG. 3.

The desired frequency response for the shaping filter is approximated by EQ. 2, The desired response can be achieved by the implementation shown in FIG. 4 using a hybrid coupler 402 and compensating impedance 401. The transfer function for this implementation of the shaping filter 400 is $$H_{303} = \frac{Z_{COMP} - R_0}{Z_{COMP} + R_0} \qquad (5)$$

It can be assumed that $\alpha_{301}=\alpha_{302}$. Hybrid coupler 402 provides signal inversion. The received signal in this case is $$V_{114} = V_{REC} + \frac{2\alpha\beta(Z_A - Z_{COMP})}{(Z_A + R_0)(Z_{COMP} + R_0)} V_{113} \qquad (6)$$

As in the HF application, self interference is suppressed by setting $Z_{COMP}=Z_A$.

Figure 5:
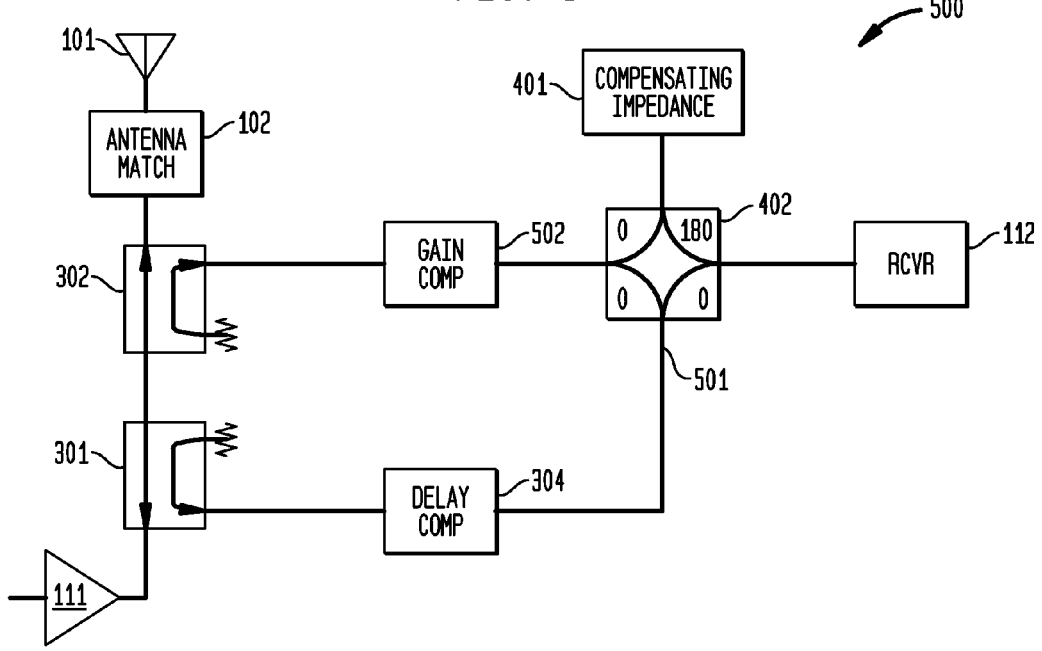
FIG. 5 shows implementation of a directional notch filter having a combiner function merged with a directional coupler.

The termination impedances 311 and 312 absorb energy reflected by shaping filter 303 and delay compensation 304. In some cases this may be sufficient that the additional isolation provided by coupler 305 is not needed. The function of power combiner or coupler 305 may be combined with the function of hybrid coupler 402 in some situations as illustrated in FIG. 5 in which signal 309 is introduced as signal 501 into combiner 402; gain control element 502 is included to match signal amplitudes. The circuit in FIG. 5 may have better gain and phase matching between signal and compensation paths than the circuit in FIG. 4 when the directional couplers provide sufficient isolation.

Figure 2:
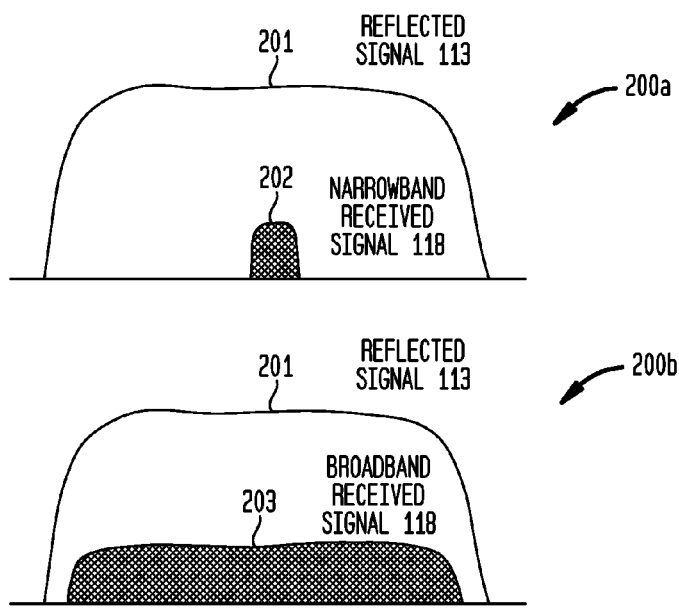
FIG. 2 is a graph of reflection from a small antenna showing the spectral components of the two signals comprising receiver input signal.
Figure 2A:
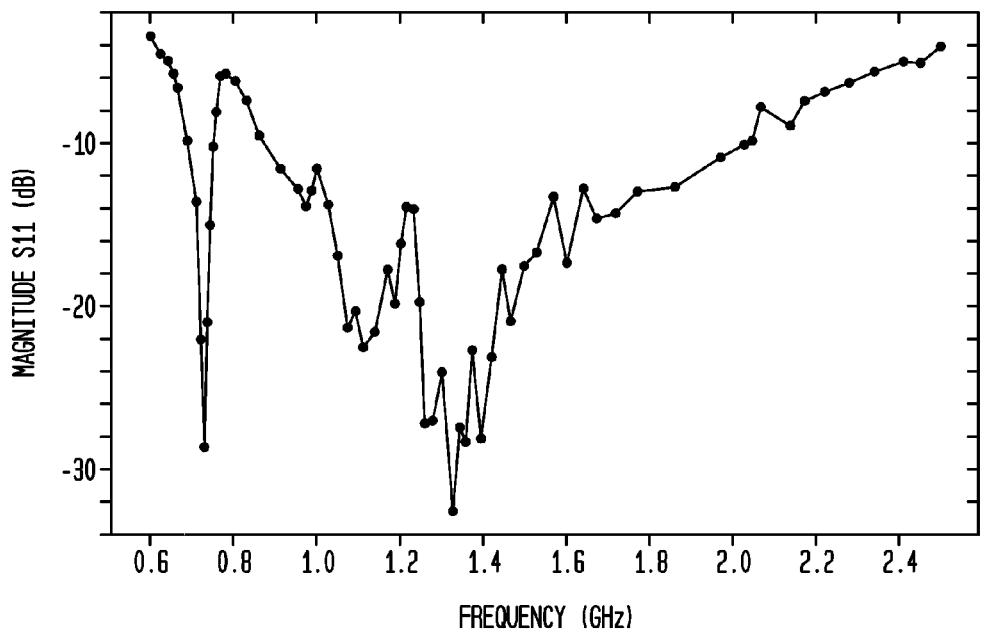
Figure 6:
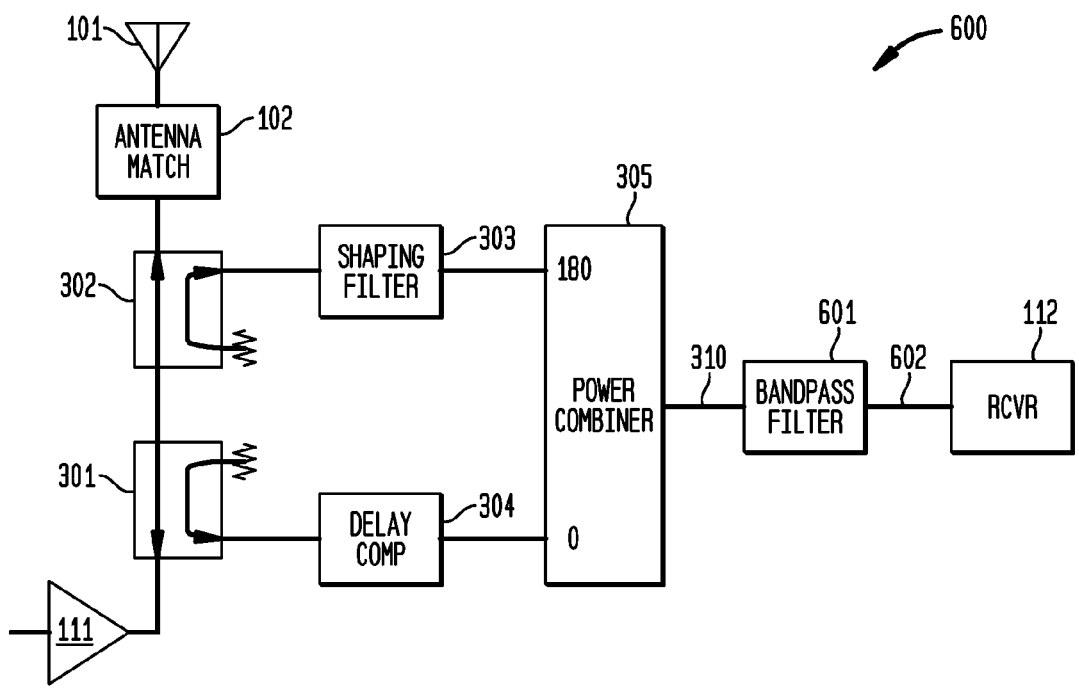
FIG. 6 shows a directional notch filter optimized for narrow band received signal.
Figure 7:
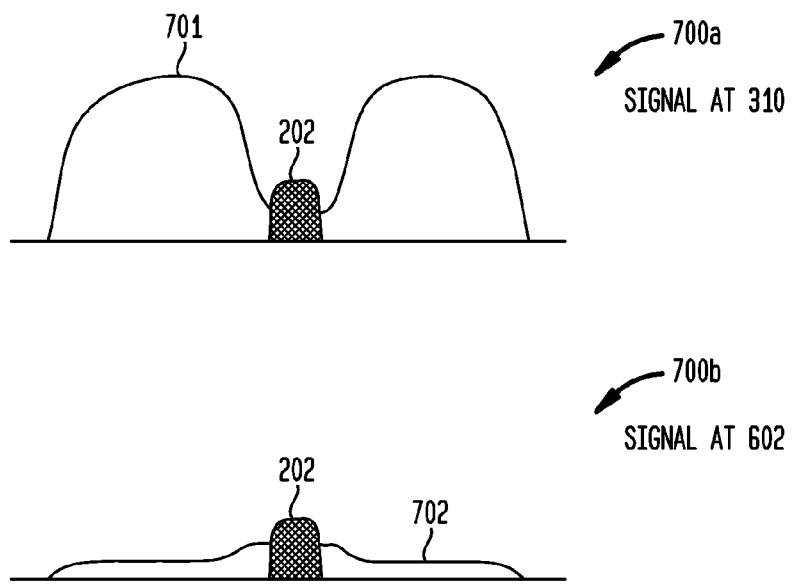
FIG. 7 shows signals in directional notch filter optimized for narrow band received waveform.

An embodiment of the directional notch filter 600 is shown in FIG. 6 which is well suited to applications where the desired receive signal is a narrow band signal as illustrated in item 200a shown in FIG. 2. It is not necessary to achieve broadband reflection cancellation in this situation. The shaping filter creates a notch in the reflected signal as illustrated in item 700a of FIG. 7. The remaining reflected energy is removed using bandpass filter 601. The signal produced by filter 601 is illustrated in FIG. 7 as item 700b, signal at 602. The notch filter circuit will absorb energy reflected by filter 601.

Figure 8:
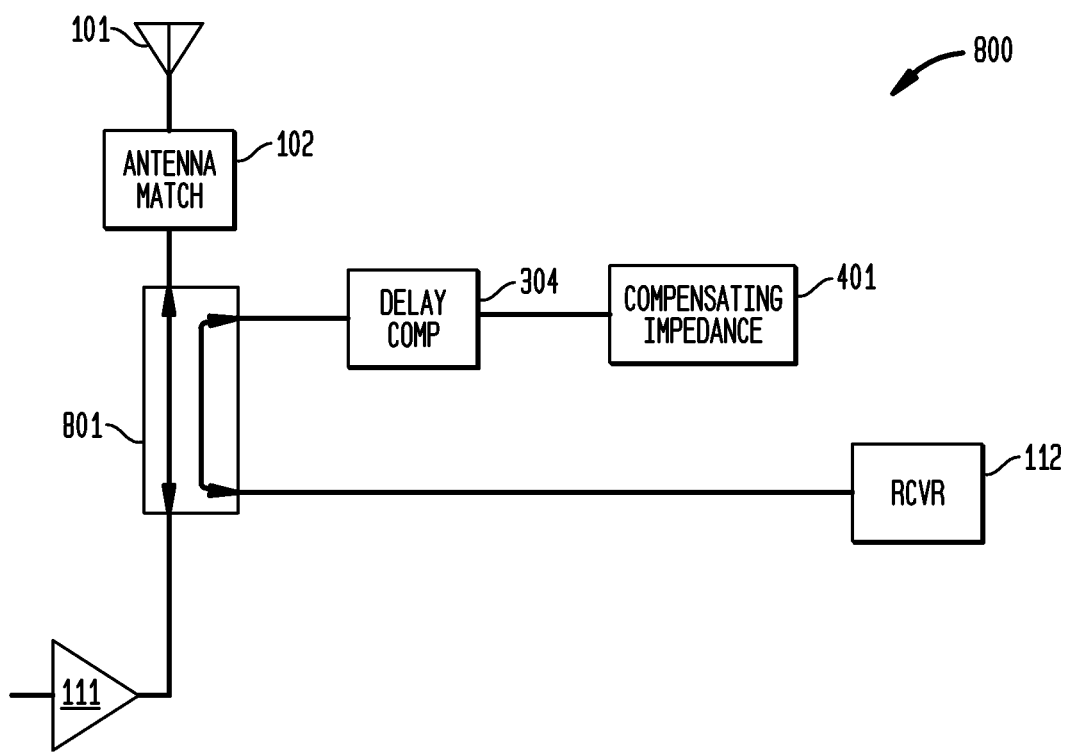
FIG. 8 shows a directional notch filter implemented using a bi-directional coupler.

Most of the components employed in the directional notch filter require controlled impedances for their proper operation. Terminations 311, 312 and 403 may be used to mitigate unwanted reflections created by elements within the directional notch filter. In some applications, the output impedance of Power amplifier 111 may be well-controlled and receiver 112 may have a well-controlled input impedance. In this case, the noted terminations may not be necessary and the functions provided by the several couplers 301, 302, 402 and 305 can be performed by a single bi-directional coupler 800 as shown in FIG. 8. Coupler 801 has a coupling factor coupling $\alpha_{801}$. A portion of transmitter power $(1-\alpha_{801}^2)$ is delivered to the antenna while the remaining portion $(\alpha_{801}^2)$ is delivered to the compensating impedance 401 via delay 304. A portion $(\alpha_{801}^2)$ of the received signal is coupled to receiver 112. Directional coupler 801 combines the reflection from compensating impedance 401 in anti-phase with the reflected signal from the antenna match 102. The response for the circuit in FIG. 8 is described by EQ 6. The desired received signal is only weakly affected by 401 since this is not in the received signal path.

Figure 9:
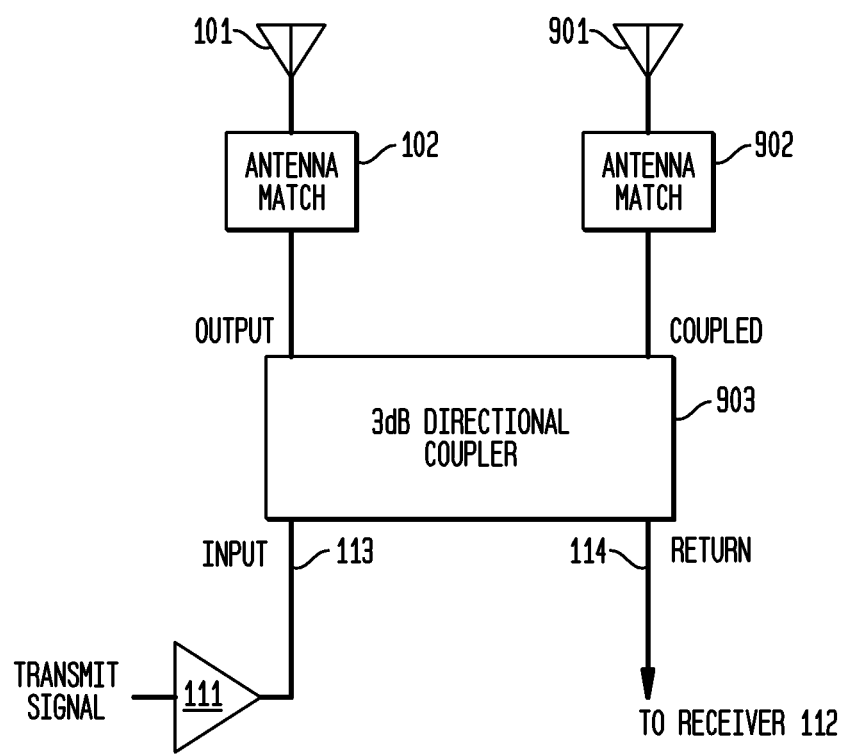
FIG. 9 shows an antenna array with improved isolation for STAR.

It may not be easy to replicate the antenna impedance using the compensation impedance over a wide bandwidth in some situations. This is particularly challenging at high power levels of 100 W or more where even better isolation is desired. The best replica circuit would be another identical antenna. This approach is feasible as illustrated in FIG. 9. A broad band 3 dB coupler with $\alpha_{903}=\beta_{903}=1/\sqrt{2}$ drives both antennas in phase and combines the signals from the antenna in anti-phase, thereby canceling the antenna reflection. The antenna reflection can be adjusted using small tuning elements placed in the antenna near field. The received signal can be represented as $$V_{114}=\rho_{903}V_{113}+\alpha^2(\Gamma_{A101}-\Gamma_{A901})+\alpha^2(g_{101\to 901}-g_{901\to 101})+\alpha(V_{R101}-V_{R901}) \quad (6)$$

where $g_{101\to 901}\approx g_{901\to 101}$ is the coupling between antennas 101 and 901 and $\rho_{903}$ is the reflection created by the coupler imperfection which was ignored in the above description.

Figure 10:
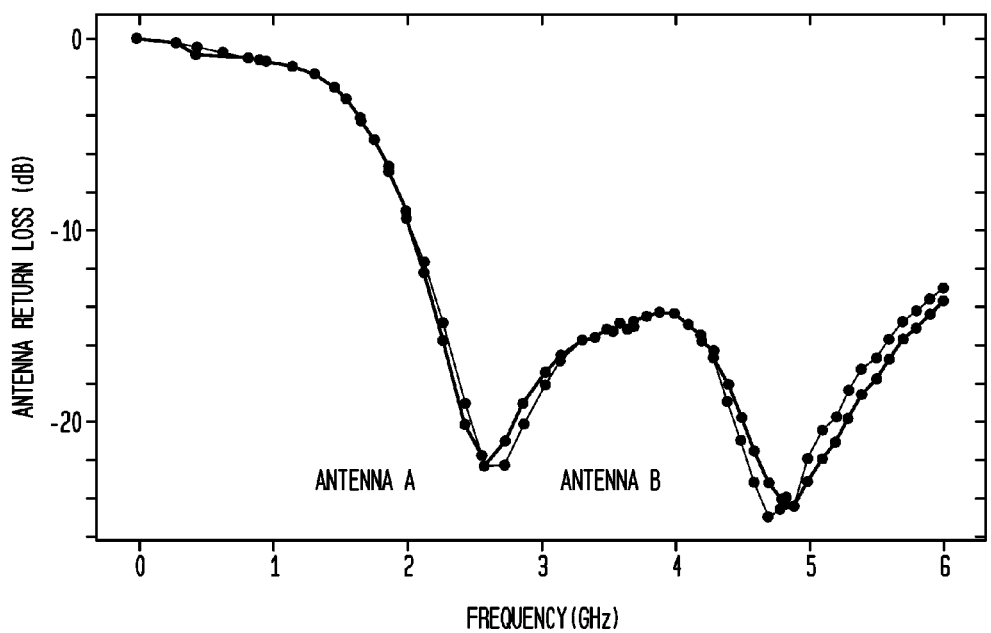
FIG. 10 shows return loss of two identical broadband planar inverted cone antennas (PICA).

FIG. 10 is the measured impedance for two planar inverted cone (PIC) antennas used to demonstrate the isolation. The antenna reflections match within 0.1 dB (1%) which should provide 20 dB of isolation. The coupling between the antennas is symmetrical and therefore cancels as well.

Figure 11:
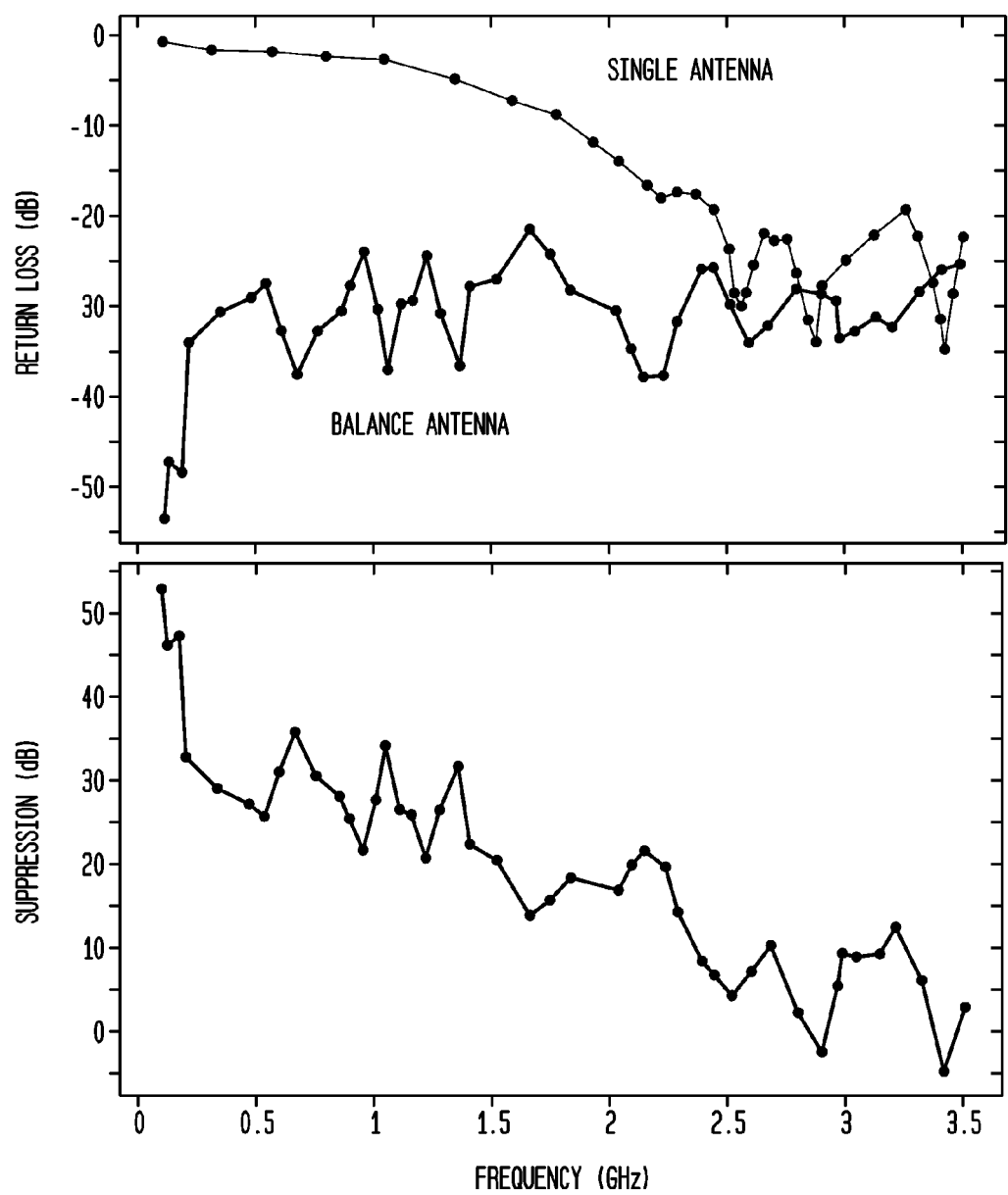
FIG. 11 demonstrates improved isolation for two-antenna array.

The advantages of the antenna array for reducing self interference is demonstrated in FIG. 11 which shows the input at the receiver input using the circuit in FIG. 9 with one antenna and two antennas. The single antenna measurement was made by substituting a 50Ω termination for the second antenna. The isolation between transmit and receive paths is improved by 20-50 dB, limited by inherent imperfections in the 3 dB coupler between 2.5-3.5 GHz.

The signal received by each antenna is $V_R \propto g(\theta) \mathcal{E}_R$ where the (azimuth) response for a single antenna is $g(\theta)$. It is necessary to design the antennas and array such that $V_{R1}$ and $V_{R2}$ are nearly independent. The far field pattern for the two antenna array can be represented as $H(\theta) \propto g_1(\theta)-g_2(\theta) e^{-j2\pi(d/\lambda)\cos(\theta)}$: destructive interference creates undesirable nulls in the far-field pattern.

Figure 12:
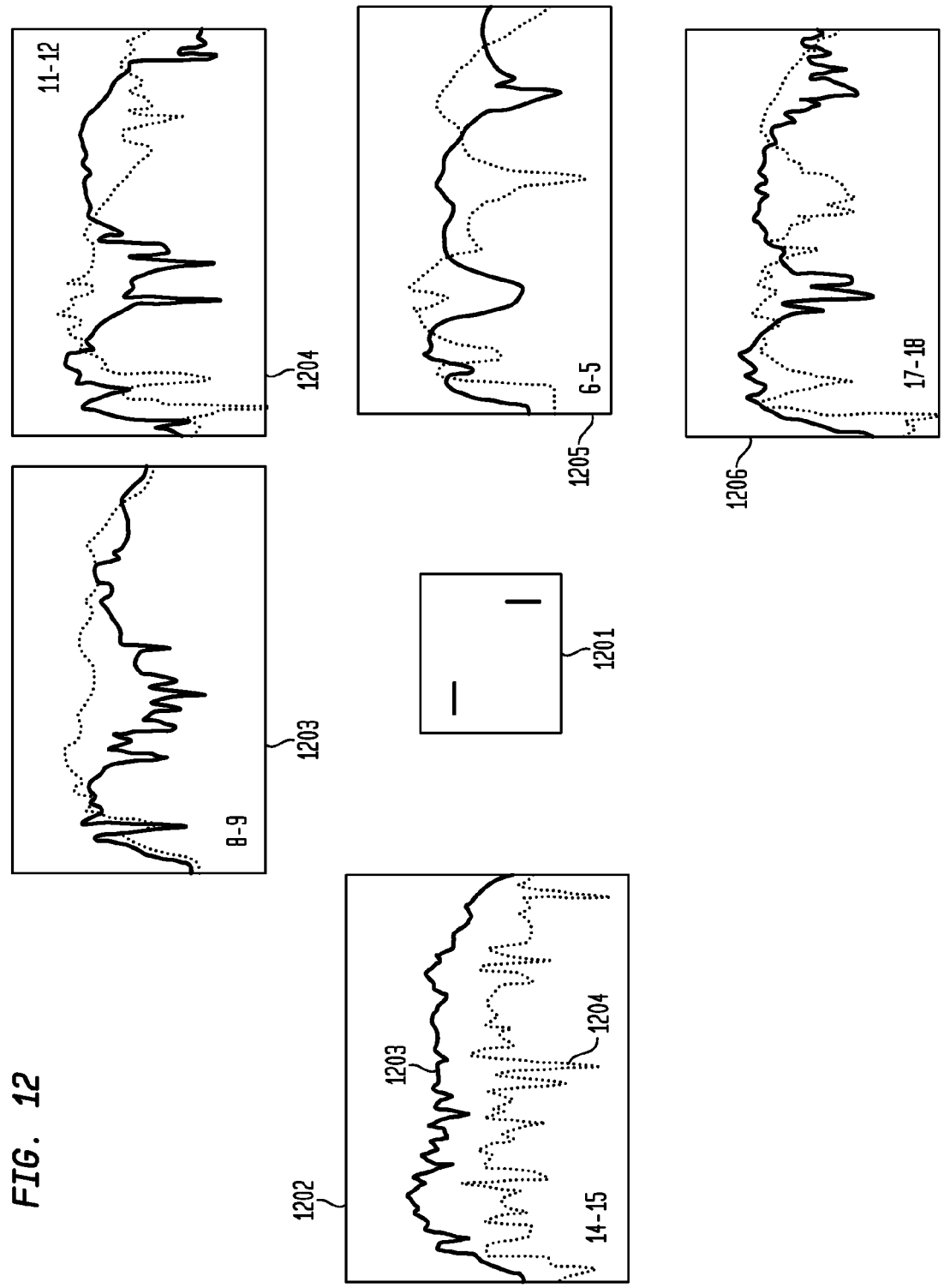
FIG. 12 shows measured antenna pattern with an array of two PICA.

The antenna pattern for the PICA array is illustrated in FIG. 12. The antenna array 1201 is comprised of antennas 101 and 901 as shown in FIG. 9. The frequency response measured with an omni-directional antenna is shown by graphs 1202-1206 in the various directions indicated by their placement in the figure. The gain for transmitted and received signals are represented by the solid, dark (1203) and dashed (1204) curves respectively. There are nulls in the response caused by destructive interference of the fields from the two omni-directional antennas when the distance from the antenna is a multiple of the wavelength. This can be avoided using a directional antenna for which $g_1(\theta) \cdot g_2(\theta) \approx 0$.

Figure 13:
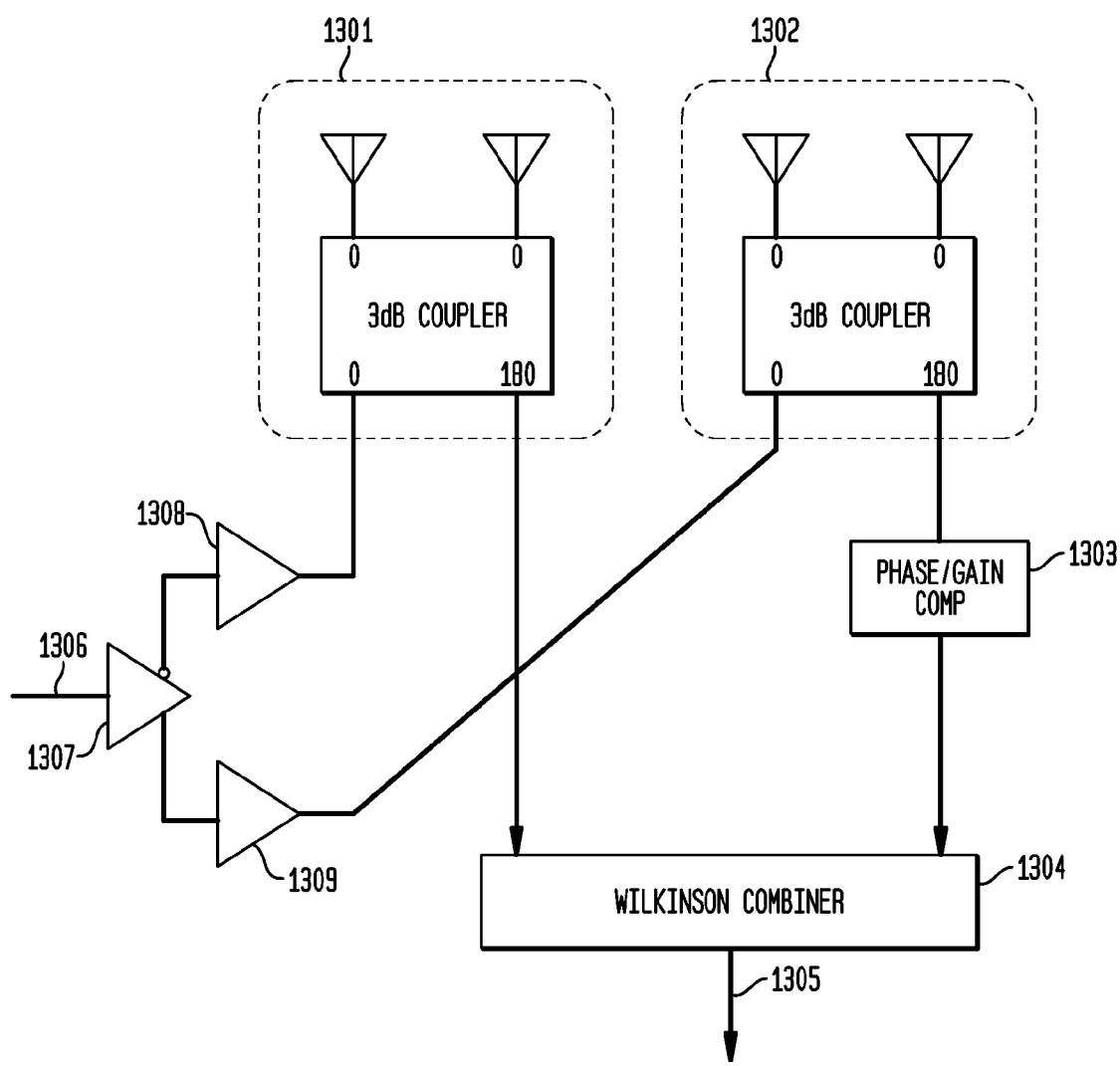
FIG. 13 shows antenna array which also provides cancellation of reflection from couplers.

FIG. 13 shows an antenna array with four antennas that provides cancellation of reflection from the coupler ρ as well as reflections from the antenna. This antenna array addresses two issues. First, it may be easier to achieve directional gain over quarter sections. Second, the power amplifiers are driven in anti-phase so that the reflections from the two 3 dB couplers are further cancelled, including that from coupler imperfections. The coupling between all antennas cancels provided there is a plane of symmetry.

As illustrated above, a passive analog circuit can attenuate high power signals before they enter the receiver subsystem. DSP methods can be used to tune or control parameters of the analog circuit. The present disclosure extends the method developed by the inventors for narrow-band HF transceivers to much higher frequencies spanning the VHF to S bands and to greater transmit power. The present invention is very different from traditional echo cancellation using DSP methods which first digitize the waveform or where a DSP is used to create a compensating waveform that cancels the reflection before the receiver.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A directional notch filter for simultaneous transmit and receive of wideband signals, the directional notch filter comprising:
   a first directional coupler and a second directional coupler for receiving from an antenna, an input signal comprising a reflection of a high-power broadband transmit signal spectrally overlapping with a low-power narrow band or broadband desired received signal, wherein the first and second directional couplers are configured to produce respective first and second signals comprising portions of the received input signal, while respective first and second terminations at isolation ports of the first and second directional couplers prevent multiple reflections within the first and second signals;
   a shaping filter for receiving the second signal from the second directional coupler, wherein the shaping filter is configured to produce a compensation signal as a replica of an antenna reflection transfer function, wherein the shaping filter creates a notch in the reflected transmit signal;
   a delay compensator for receiving the first signal and matching the path delay of the first signal to the second signal and outputting a delayed first signal; and
   a power combiner configured to receive as inputs, the compensation signal and the delayed first signal, and to subtract the compensation signal from the delayed first signal to cancel self-interference and provide a combined output as an input to a receiver.

2. The directional notch filter according to claim 1, wherein the compensation signal V is determined by the shaping transfer function of the shaping filter H as V=βαHV', where β is the forward path loss in the direct path of the first directional coupler, α is the forward coupling factor of the second directional coupler, and V' is the signal from the power amplifier.

3. The directional notch filter according to claim 1, wherein the antenna comprises four antennas combined in two antenna arrays.

4. The directional notch filter as set forth in claim 1, where the delayed first signal is matched to the second signal when combined at the power combiner.

* * * * *

UNITED STATES PATENT AND TRADEMARK OFFICE
CERTIFICATE OF CORRECTION

PATENT NO. : 8,942,658 B2  
APPLICATION NO. : 13/285799  
DATED : January 27, 2015  
INVENTOR(S) : Banwell et al.

Page 1 of 1

It is certified that error appears in the above-identified patent and that said Letters Patent is hereby corrected as shown below:

Title page, item (75), under "Inventors", in Column 1, Line 3, delete "C Liberti," and insert -- C. Liberti --, therefor.

Drawings

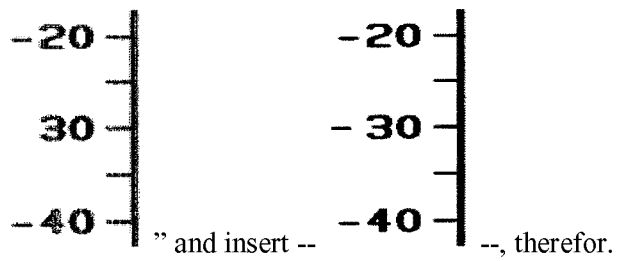

In Fig. 11, Sheet 8 of 10, delete " " and insert -- --, therefor.

Specification

In Column 4, Line 25, delete "$V_{114} = V_{REC} (\beta_{302}\alpha_{301}\Gamma_A - \beta_{301}\alpha_{302}H_{303})V_{113}$" and insert -- $V_{114} = V_{REC} + (\beta_{302}\alpha_{301}\Gamma_A - \beta_{301}\alpha_{302}H_{303})V_{113}$ --, therefor.

In Column 4, Line 45, delete "$H_{303} = \dfrac{Z_{COMP} - R_0}{Z_{COMP} + R_0}$" and insert -- $H_{303} = -\dfrac{Z_{COMP} - R_0}{Z_{COMP} + R_0}$ --, therefor.

Signed and Sealed this  
Twentieth Day of October, 2015

Michelle K. Lee  
*Director of the United States Patent and Trademark Office*